United States Patent
Moonamkandy et al.

(10) Patent No.: US 9,097,507 B2
(45) Date of Patent: Aug. 4, 2015

(54) NON-CONTACT SHIFT LEVER POSITION DETECTOR AND HEALTH STATUS MONITORING SYSTEM

(71) Applicant: HONEYWELL INTERNATIONAL INC., Morristown, NJ (US)

(72) Inventors: Shakil Moonamkandy, Karnataka (IN); Girish Krishnaiah, Karnataka (IN); Prerana Deepak Kapure, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 122 days.

(21) Appl. No.: 13/921,746

(22) Filed: Jun. 19, 2013

(65) Prior Publication Data
US 2014/0375306 A1 Dec. 25, 2014

(51) Int. Cl.
*G01B 7/30* (2006.01)
*G01B 7/14* (2006.01)
*F16H 59/10* (2006.01)
*G01D 5/14* (2006.01)
*F16H 59/04* (2006.01)
*F16H 61/12* (2010.01)
*F16H 59/02* (2006.01)

(52) U.S. Cl.
CPC .............. *G01B 7/14* (2013.01); *F16H 59/044* (2013.01); *F16H 59/105* (2013.01); *G01B 7/30* (2013.01); *G01D 5/145* (2013.01); *F16H 61/12* (2013.01); *F16H 2059/0256* (2013.01); *F16H 2061/1284* (2013.01)

(58) Field of Classification Search
None
See application file for complete search history.

(56) References Cited

U.S. PATENT DOCUMENTS

| | | | | |
|---|---|---|---|---|
| 6,382,045 | B1* | 5/2002 | Wheeler | 74/473.12 |
| 7,621,198 | B2* | 11/2009 | Kako et al. | 74/523 |
| 8,739,647 | B2* | 6/2014 | Benson et al. | 74/473.1 |
| 2004/0035237 | A1* | 2/2004 | Matsui et al. | 74/473.12 |
| 2005/0235771 | A1* | 10/2005 | Yokoyama | 74/473.33 |
| 2009/0115407 | A1* | 5/2009 | Takigawa | 324/207.21 |
| 2009/0150033 | A1* | 6/2009 | Kawamoto | 701/51 |

FOREIGN PATENT DOCUMENTS

| | | |
|---|---|---|
| DE | 10038433 A1 | 2/2002 |
| JP | 2010243287 A | 10/2010 |
| KR | 20120022441 A | 3/2012 |

OTHER PUBLICATIONS

EP Extended Search Report for Application No. 14171632.4 dated Oct. 13, 2014.

* cited by examiner

*Primary Examiner* — Minh N Tang
(74) *Attorney, Agent, or Firm* — Ingrassia Fisher & Lorenz, P.C.

(57) ABSTRACT

A non-contact shift lever position detector includes a housing, a gear position shift lever, a magnet, a plurality of magnetic sensors, and a processor. The gear position shift lever is disposed partially within the housing and is moveable to at least a first position, a second position, and a third position. The magnet is disposed within the housing, and is coupled to the gear position shift lever and is movable therewith. The magnetic sensors are fixedly disposed within the housing and each magnetic sensor is spaced apart from the magnet and is configured to supply an output voltage representative of its proximity to the magnet. The processor is coupled to receive the output voltage supplied from each of the magnetic sensors and is configured, upon receipt thereof, to determine when the gear position shift lever is in the first position, the second position, and the third position.

9 Claims, 5 Drawing Sheets

NON-CONTACT SHIFT LEVER POSITION DETECTOR AND HEALTH STATUS MONITORING SYSTEM

TECHNICAL FIELD

The present invention generally relates to shift lever position detection, and more particularly relates to a non-contact shift lever position detector and health status monitor.

BACKGROUND

Many modern electronic shifters use one or more position sensors at each shift position (e.g., Forward, Neutral, Reverse). These position sensors are, in many cases, contact-type switches. While these types of switches have generally worked well to date, these switches do exhibit certain drawbacks. For example, these switches can exhibit limited life due to mechanical wear and tear. Moreover, contact sputtering can lead to reduced reliability. In particular, a contact sputter could cause undesired connections, which could result in blown fuses. The current configuration of the switches also makes it difficult to implement health monitoring. All of these drawbacks result in a relatively expensive and complicated system, which leads to increased manufacturing costs.

Hence, there is a need for a shift lever position detector that does not rely on contact-type switches and/or allows for health monitoring and/or is relatively inexpensive and relatively less complicated than current solutions. The present invention addresses one or more of these needs.

BRIEF SUMMARY

In one embodiment, a non-contact shift lever position detector includes a housing, a gear position shift lever, a magnet, a plurality of magnetic sensors, and a processor. The gear position shift lever is disposed partially within the housing and is moveable to at least a first position, a second position, and a third position. The magnet is disposed within the housing, and is coupled to the gear position shift lever and is movable therewith. The magnetic sensors are fixedly disposed within the housing and include a first magnetic sensor, a second magnetic sensor, and a third magnetic sensor. Each magnetic sensor is spaced apart from the magnet and is configured to supply an output voltage representative of its proximity to the magnet. The processor is coupled to receive the output voltage supplied from each of the magnetic sensors and is configured, upon receipt thereof, to determine when the gear position shift lever is in the first position, the second position, and the third position.

In another embodiment, non-contact shift lever position detector includes a housing, a gear position shift lever, a dipole magnet, a plurality of Hall sensors, and a processor. The gear position shift lever is disposed partially within the housing and is moveable to a first position, a second position, and a third position. A dipole magnet is disposed within the housing, and is coupled to the gear position shift lever and is movable therewith. The Hall sensors are fixedly disposed within the housing and include a first Hall sensor, a second Hall sensor, and a Hall magnetic sensor. Each Hall sensor is spaced apart from the magnet and is configured to supply an output voltage representative of its proximity to the magnet. The processor is coupled to receive the output voltage supplied from each of the Hall sensors and is configured, upon receipt thereof, to determine when the gear position shift lever is in the first position, the second position, and the third position.

In yet another embodiment, non-contact shift lever position detector includes a housing, a gear position shift lever, a dipole magnet, a plurality of Hall sensors, and a processor. The gear position shift lever is disposed partially within the housing and is moveable to a first position, a second position, and a third position. The dipole magnet is disposed within the housing, and is coupled to the gear position shift lever and is movable therewith. The Hall sensors are fixedly disposed within the housing and include a first Hall sensor, a second Hall sensor, and a Hall magnetic sensor. Each Hall sensor is spaced apart from the magnet and is configured to supply an output voltage representative of its proximity to the magnet. The processor is coupled to receive the output voltage supplied from each of the Hall sensors and is configured, upon receipt thereof, to determine when the gear position shift lever is in the first position, the second position, and the third position and determine detector health status.

Furthermore, other desirable features and characteristics of the non-contact shift lever position detector will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
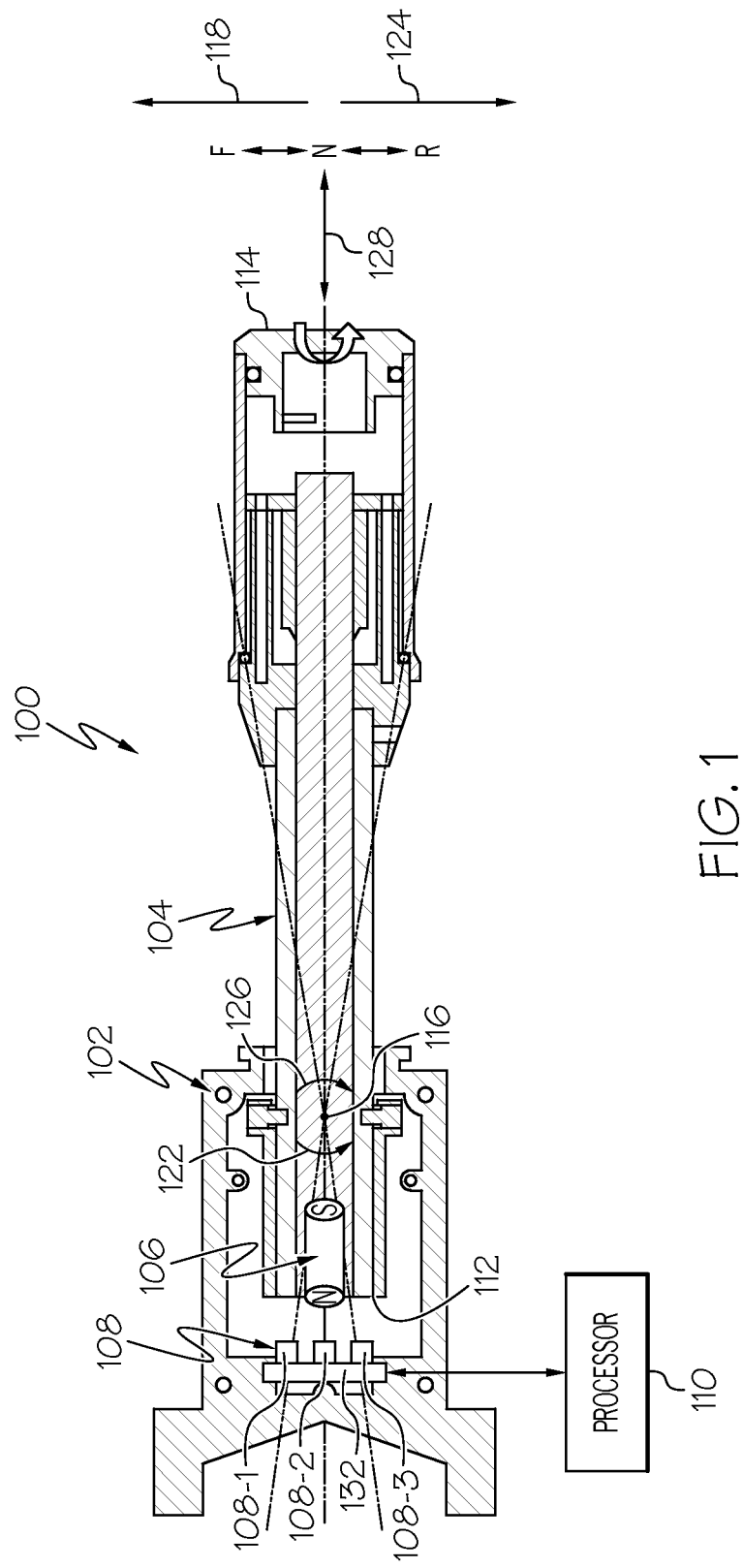
FIG. 1 depicts a cross section view of one embodiment of a non-contact shift lever position detector.

Referring to FIG. 1, a cross section view of one embodiment of a non-contact shift lever position detector 100 is depicted and includes a housing 102, a gear position shift lever 104, a magnet 106, a plurality of magnetic sensors 108, and a processor 110. The gear position shift lever 104 is disposed partially within the housing 102 and is moveable to a plurality of positions. More specifically, the gear position shift lever 104 includes a first end 112 and a second end 114. The first end 112 is disposed within the housing 102, and the second end is disposed outside of the housing 102. The number of positions to which the gear position shift lever 104 may be moved may vary, but in the depicted embodiment it is moveable to at least a first position, a second position, and a third position. Moreover, the first, second, and third positions may correspond to various vehicle transmission functions, but in the depicted embodiment, these positions correspond to neutral (N), forward (F), and reverse (R) positions, respectively.

The gear position shift lever 104 is mounted within the housing 102 such that it is rotatable about an axis 116 relative to the housing 102. Thus, as FIG. 1 further depicts, if the second end 114 of the gear position shift lever 104 is moved in a first translational direction 118 (e.g., from N to F or from R to N), the gear position shift lever 104 rotates about the axis 116 in a first rotational direction 122, and the first end 112 of the gear position shift lever 104 moves in a second translational direction 124. Conversely, if the second end 114 of the gear position shift lever 104 is moved in the second translational direction 124 (e.g., from N to R or from F to N), the gear position shift lever 104 rotates about the axis 116 in a second rotational direction 126, and the first end 112 of the gear position shift lever 104 moves in the first translational direction 118. In some embodiments, the gear position shift lever 104 may also be moved in a third direction 128, which is perpendicular to the first and second directions 118, 124, to implement another function such as, for example, sounding a horn.

The magnet 106 is disposed within the housing 102, and is coupled to the gear position shift lever 104 and is thus movable therewith. More specifically, the magnet 106 is coupled to the first end 112 of the gear position shift lever 104. Thus, when the first end 112 of the gear position shift lever 104 is moved in the first translational direction 118 or the second translation direction 124, the magnet 106 is also moved in first translational direction 118 or the second translation direction 124. This movement, and thus the position of the gear position shift lever 104, is sensed by the magnetic sensors 108. The magnet 106 may be variously implemented. For example, it may be a permanent magnet or an electromagnet. In the depicted embodiments, however, the magnet 106 is is a permanent, dipole magnet having a north pole (N) and a south pole (S).

The magnetic sensors 108 are fixedly disposed within the housing 102 and are spaced apart from the magnet 106 by a gap. In the depicted embodiment, the magnetic sensors 108 are mounted on a printed circuit board (PCB) 132, which is fixedly coupled to the housing 102. This is, of course, merely exemplary of one mounting arrangement. The number of magnetic sensors 108 may vary, but in the depicted embodiment, there are three magnetic sensors 108—a first magnetic sensor 108-1, a second magnetic sensor 108-2, and a third magnetic sensor 108-3. As may be appreciated, the number of magnetic sensors 108 will preferably correspond to the number of positions to which the gear position shift lever 104 may be placed.

No matter the specific number of magnetic sensors 108, each magnetic sensor 108 is configured to supply an output voltage representative of its proximity to the magnet 106. The magnetic sensors 108 may be implemented using any one of numerous types of non-contact devices to provide this functionality. For example, the magnetic sensors 108 may be implemented using magneto-resistive (MR) sensors, Hall sensors, or any one of numerous other magnetic sensing elements that provide a continuous analog output. In the depicted embodiment, however, the magnetic sensors 108 are each Hall sensors. The output voltage from each magnetic sensor is supplied to the processor 110.

The processor 110 is coupled to receive the output voltage supplied from each of the magnetic sensors 108 and is configured, upon receipt of the output voltages, to determine the position of the gear position shift lever 104. In particular, the processor 110 is configured to determine when the gear position shift lever 104 is in the first position, the second position, and the third position. The processor 110 is also configured, upon receipt of the output voltages, to determine the health status of the shift lever position detector 100. That is, based upon the output voltages, the processor 110 is configured to determine whether one or more of the magnetic sensors 108 is faulty or inoperable, or whether the gap between the magnet 106 and magnetic sensors 108 has increased or decreased beyond a desired threshold distance.

It will be appreciated that the configuration of the magnet 106 and the magnetic sensors 108 may vary to implement the above-described functionality. Indeed, the poles of the magnets 106 can be suitably configured to generate any one of numerous representative signals. Moreover, either the magnet poles or the sensing axes of the magnetic position sensors 108 can be variously disposed. Various configurations and associated responses are depicted in FIGS. 2-10, and will each be described, beginning first with the configuration depicted in FIG. 2.

Figure 2:
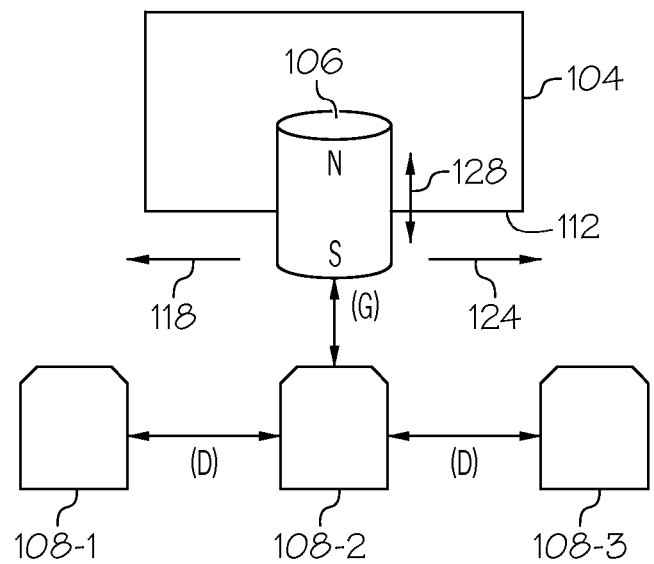
FIGS. 2-9 depict various configurations and associated responses of the non-contact shift lever position detector of FIG. 1.

In the embodiment depicted in FIG. 2, the magnet 106 is disposed perpendicular to the magnetic sensors 108. In other words, the magnet 106 is disposed such that one magnetic pole is faced toward each of the magnetic sensors 108 and the other magnetic pole is faced away from each of the magnetic sensors 108. In the depicted embodiment, the south pole (S) is faced toward the magnetic sensors 108. It will be appreciated, however, that the magnet 106 could be disposed so that the north pole (N) faces toward the magnetic sensors 108. Moreover, although the depicted magnet 106 is a cylindrically shaped magnet, various other shapes may also be used.

As previously noted, the magnet 106 is spaced apart from the magnetic sensors 108 by a gap (G). In addition, the first 108-1 and second 108-2 magnetic sensors, and the second 108-2 and third 108-3 magnetic sensors, are spaced apart by a distance (D). It will be appreciated that the values of the gap (G) and distance (D) may be varied to meet desired response characteristics. In one particular embodiment, when the gap (G) is about 5.0 millimeters (mm) and the distance (D) is about 11.5 mm, the response of the magnetic sensors 108 is graphically depicted in FIG. 3. It should be noted that in the depicted graph 300, the reference (or zero-distance) position corresponds to the position depicted in FIG. 2. That is, with magnet 106 disposed adjacent to the second magnetic sensor 108-2.

Figure 3:
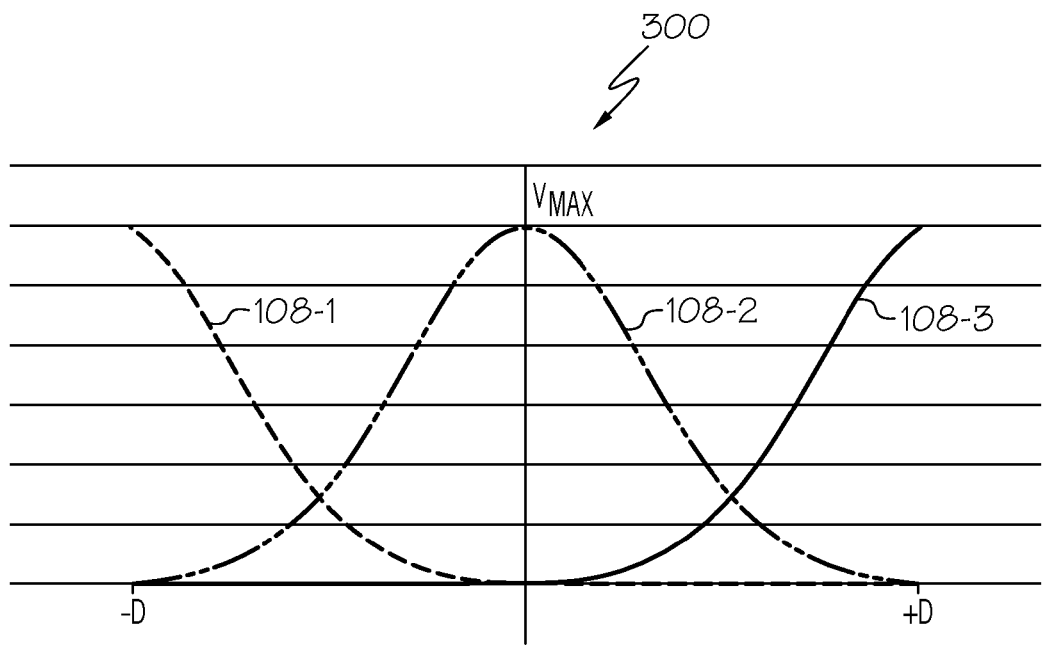

As may be readily appreciated by viewing the response graph 300 of FIG. 3, the processor 110 may be suitably configured to determine, based on the output voltages of the magnetic sensors 108, to determine when the gear position shift lever 104 is in the first, second, and third positions. The processor 110 may also be configured to readily assess the health status of the magnetic sensors 108.

Figure 4:
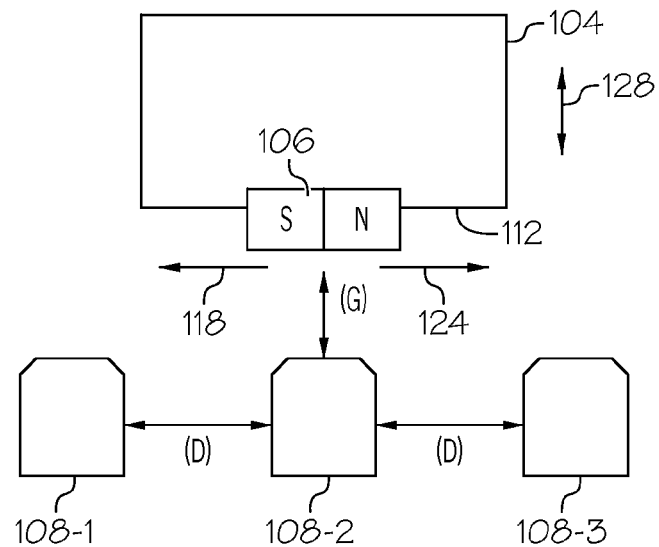
Figure 5:
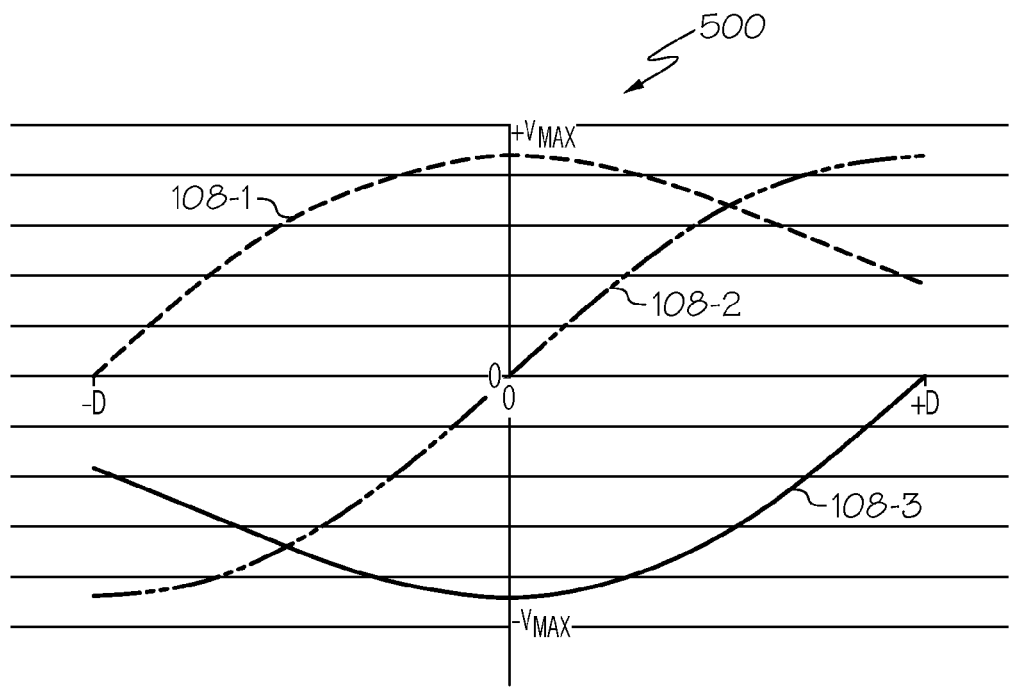

Referring now to FIG. 4, in this embodiment the magnet 106 is disposed parallel to the magnetic sensors 108. In other words, the magnet 106 is disposed such that both magnetic poles face each of the magnetic sensors 108. It is noted that in the depicted embodiment, when the magnet 106 is in the reference position, the magnet 106 is disposed such that the south pole (S) is closer to first magnetic sensor 108-1 than it is to the third magnetic sensor 108-3, and the north pole (N) is closer to the third magnetic sensor 108-3 than it is to the first magnetic sensor 108-1. It will be appreciated, however, that the magnet 106 could be oppositely disposed. Moreover, although the depicted magnet 106 is again a cylindrically shaped magnet, various other shapes may also be used.

The magnet 106 is spaced apart from the magnetic sensors 108 by a gap (G). Here too, the first 108-1 and second 108-2 magnetic sensors, and the second 108-2 and third 108-3 magnetic sensors, are spaced apart by a distance (D). It will be appreciated that the values of the gap (G) and distance (D) may be varied to meet desired response characteristics. In one particular embodiment, when the gap (G) is about 5.0 mm and the distance (D) is about 11.5 mm, the response of the magnetic sensors 108 is graphically depicted in FIG. 5. It should be noted that in the depicted graph 500, the reference position also corresponds to the position depicted in FIG. 4. That is, with magnet 106 disposed adjacent to the second magnetic sensor 108-2.

The processor 110 may be suitably configured to determine, based on the output voltages of the magnetic sensors 108, to determine when the gear position shift lever 104 is in the first, second, and third positions. The processor 110 may also be configured to readily assess the health status of the magnetic sensors 108.

Figure 6:
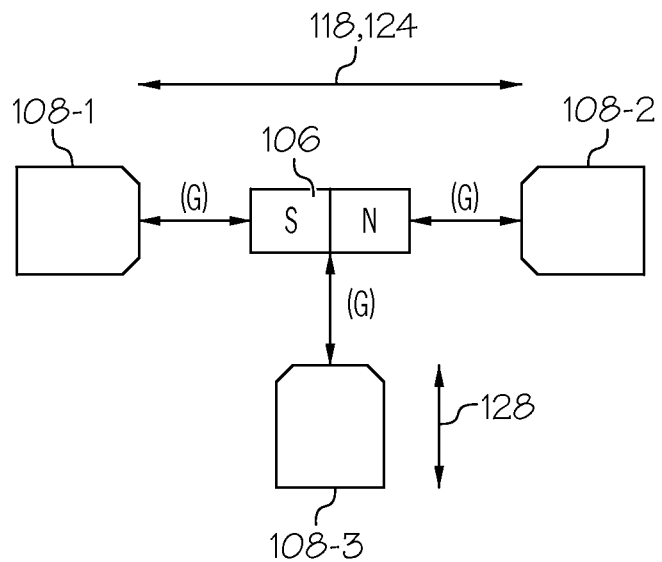

With reference now to FIG. 6, this embodiment depicts a configuration in which the first and second magnetic sensors 108-1, 108-2 are used to sense movement of the gear position shift lever 104 in the first and second directions 118, 124, and the third magnetic sensor 108-3 is used to sense movement of the gear position shift lever 104 in the third direction 128. Thus, the third magnetic sensor 108-3 may be used for implement another function such as, for example, sounding a horn.

In the depicted embodiment, the magnetic sensors 108 are disposed in a semi-circular pattern and, when the magnet 106 is in the reference position, the magnet 106 is disposed equidistantly from each of the magnetic sensors 108. Moreover, one magnetic pole is faced toward the first magnetic sensor 108-1, the other magnetic pole is faced toward the second magnetic sensor 108-2, and both magnetic poles are faced toward the third magnetic sensor 108-3. It is noted that in the depicted embodiment the magnet 106 is disposed such that the south pole (S) is faced toward the first magnetic sensor 108-1 and the north pole is faced toward the third magnetic sensor 108-3. It will be appreciated, however, that the magnet 106 could be oppositely disposed. Moreover, although the depicted magnet 106 is again a cylindrically shaped magnet, various other shapes may also be used.

Figure 7:
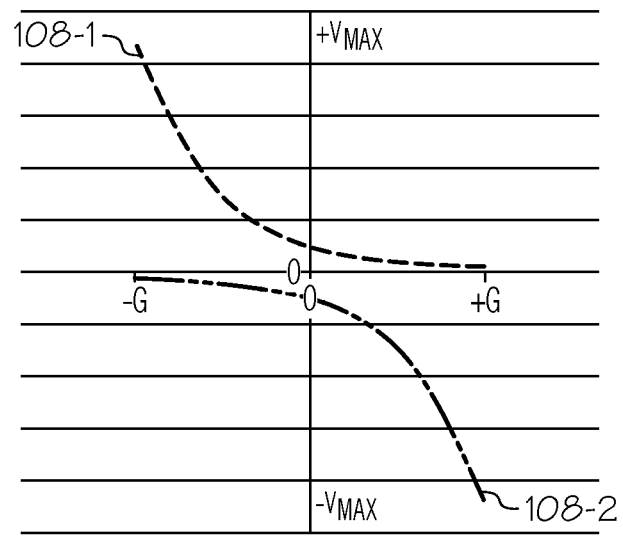
Figure 8:
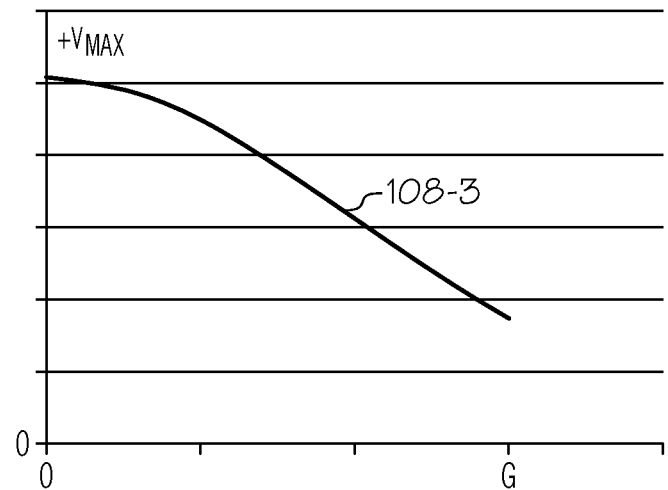

The magnet 106 is spaced apart from all three of the magnetic sensors 108 by a gap (G). It will be appreciated that the value of the gap (G) may be varied to meet desired response characteristics. In one particular embodiment, when the gap (G) is about 6.0 mm, the response of the magnetic sensors 108 is graphically depicted in FIGS. 7 and 8. In particular, the response of the first and second magnetic sensors 108-1, 108-2 is depicted in FIG. 7, and the response of the third magnetic sensor 108-2 is depicted in FIG. 8. As with the previously described embodiments, in the depicted graphs 700, 800, the reference position corresponds to the position depicted in FIG. 6, in which the magnet 106 disposed equidistantly from each of the magnetic sensors 108.

The processor 110 may be suitably configured, based on the output voltages of the first and second magnetic sensors 108-1, 108-2, to determine when the gear position shift lever 104 is in the first, second, and third positions. The processor 110 may also be configured, based on the output voltage of the third magnetic sensor 108-3, to determine when the gear position shift lever 104 is moved in the third direction 128, toward the third magnetic sensor 108-3. The processor 110 may also be configured to readily assess the health status of the magnetic sensors 108.

Figure 9:
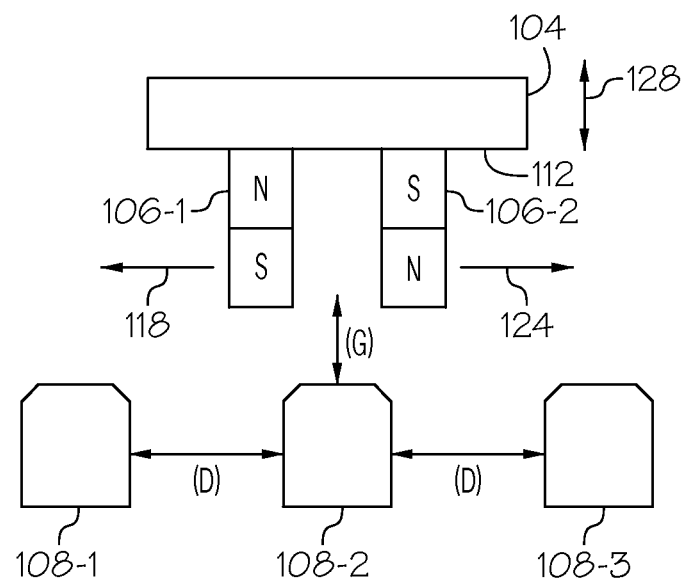

The embodiment depicted in FIG. 9 is configured similar to the embodiment of FIG. 2, but the magnet 106 comprises two magnets (e.g., 106-1, 106-2) instead of a single magnet. Moreover, the two magnets 106-1, 106-2 are oppositely disposed. Similar to the embodiment depicted in FIG. 2, the magnets 106 are spaced apart from the magnetic sensors 108 by a gap (G), and the first 108-1 and second 108-2 magnetic sensors, and the second 108-2 and third 108-3 magnetic sensors, are spaced apart by a distance (D). It will be appreciated that the values of the gap (G) and distance (D) may be varied to meet desired response characteristics. In one particular embodiment, when the gap (G) is about 5.0 millimeters (mm) and the distance (D) is about 11.5 mm, the response of the magnetic sensors 108 is graphically depicted in FIG. 10. Again, the reference position corresponds to the position depicted in FIG. 9, in which the magnets 106 are disposed adjacent to the second magnetic sensor 108-2.

As with each of the previously described embodiments, the processor 110 may be suitably configured to determine, based on the output voltages of the magnetic sensors 108, to determine when the gear position shift lever 104 is in the first, second, and third positions. The processor 110 may also be configured to readily assess the health status of the magnetic sensors 108.

It was previously noted that the gear position shift lever 104 may also be moved in a third direction 128, which is perpendicular to the first and second directions 118, 124, to implement another function such as, for example, sounding a horn. As may be appreciated, when the gear shift lever 104 is moved in the third direction 128, the output voltages of all of the magnetic sensors 108 will vary. The processor 110 is additionally configured to determine, based on the output voltage variations of the magnetic sensors 108, to determine when the gear position shift lever 104 is moved in the third direction 128.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A non-contact shift lever position detector, comprising:
a housing;
a gear position shift lever disposed partially within the housing and moveable to at least a first position, a second position, and a third position;
a magnet disposed within the housing, the magnet coupled to the gear position shift lever and movable therewith;
a plurality of magnetic sensors fixedly disposed within the housing and including a first magnetic sensor, a second magnetic sensor, and a third magnetic sensor, each magnetic sensor spaced apart from the magnet by a gap and configured to supply an independent continuous analog output voltage representative of its proximity to the magnet; and
a processor coupled to receive the continuous analog output voltage supplied from each of the magnetic sensors and configured, upon receipt thereof, to determine:
when the gear position shift lever is in the first position, the second position, and the third position,
when one or more of the magnetic sensors is faulty or inoperable, and
when the gap between the magnet and the magnetic sensors has increased or decreased beyond a threshold distance.

2. The detector of claim 1, wherein the first, second, and third magnetic sensors each comprise a Hall sensor.

3. The detector of claim 1, wherein the magnet is a dipole magnet and is disposed such that one magnetic pole is faced toward each magnetic sensor and one magnetic pole is faced away from each magnetic sensor.

4. The detector of claim 1, wherein the magnet is a dipole magnet and is disposed such that both magnetic poles are faced toward each magnetic sensor.

5. The detector of claim 1, wherein the magnet is a dipole magnet, and wherein the magnet and the magnetic sensors are disposed such that:
one magnetic pole is faced toward the first magnetic sensor;
one magnetic pole is faced toward the second magnetic sensor; and
both magnetic poles are faced toward the third magnetic sensor.

6. The detector of claim 5, wherein:
the gear position shift lever, when moved to the first position, the second position, and the third position, is configured to cause the magnet to move along a first axis; and
the gear position shift lever is further configured to selectively move the magnet along a second axis that is perpendicular to the first axis.

7. The detector of claim 6, wherein the processor is further configured to determine movement of the magnet along the second axis.

8. The detector of claim 1, wherein the magnet comprises a first magnet and a second magnet paced apart from each other.

9. The detector of claim 8, wherein:
the first and second magnets are each dipole magnets; and
the first and second magnets are disposed such that one magnetic pole is faced toward each magnetic sensor and one magnetic pole is faced away from each magnetic sensor.

* * * * *